(12) United States Patent
Shinotsuka et al.

(10) Patent No.: US 7,042,830 B2
(45) Date of Patent: May 9, 2006

(54) PHASE-CHANGE OPTICAL INFORMATION RECORDING MEDIUM, AND OPTICAL INFORMATION RECORDING AND REPRODUCING APPARATUS AND METHOD FOR THE SAME

(75) Inventors: Michiaki Shinotsuka, Kanagawa (JP); Hiroyuki Iwasa, Kanagawa (JP); Takao Yamada, Tokushima (JP); Toshio Matsushita, Tokushima (JP); Yasuo Kanbara, Tokushima (JP); Shigeki Okauchi, Tokushima (JP)

(73) Assignee: Ricoh Company, Ltd., Tokyo (JP)

( * ) Notice: Subject to any disclaimer, the term of this patent is extended or adjusted under 35 U.S.C. 154(b) by 686 days.

(21) Appl. No.: 10/192,246

(22) Filed: Jul. 9, 2002

(65) Prior Publication Data

US 2003/0035360 A1 Feb. 20, 2003

(30) Foreign Application Priority Data

Jul. 9, 2001 (JP) .............................. 2001-208177

(51) Int. Cl.
*G11B 7/24* (2006.01)
(52) U.S. Cl. ................ 369/275.1; 369/275.1; 369/13.01

(58) Field of Classification Search ................ None
See application file for complete search history.

(56) References Cited

U.S. PATENT DOCUMENTS 5,298,305 A    3/1994   Shinozuka et al.
6,312,780 B1*  11/2001  Kasami et al. .............. 369/283

FOREIGN PATENT DOCUMENTS

JP         5234136        9/1993

OTHER PUBLICATIONS

Pending claims and drawings of U.S. Appl. No. 10/029,100, filed Dec. 21, 2001.

\* cited by examiner

*Primary Examiner*—Muhammad Edun
(74) *Attorney, Agent, or Firm*—Cooper & Dunham LLP

(57) ABSTRACT

The present invention relates to a phase-change optical information recording medium comprising a recording layer which reversibly phase-changes between the crystalline phase and the amorphous phase by irradiation of a light having a recording wavelength of 390 to 430 nm, and a light transmittance thermally controllable layer showing a light transmittance varying according to temperature, in which the light transmittance increases at a rate of 0.2 to 0.7% /10° C.

21 Claims, 3 Drawing Sheets

PHASE-CHANGE OPTICAL INFORMATION RECORDING MEDIUM, AND OPTICAL INFORMATION RECORDING AND REPRODUCING APPARATUS AND METHOD FOR THE SAME

BACKGROUND OF THE INVENTION

1. Field of the Invention

The present invention relates to a phase-change optical information recording medium in which information may be recorded and reproduced by irradiating a beam to a recording layer to generate optical change of material of the recording layer, thereby simultaneously rewriting the information, and an optical information recording and reproducing apparatus and method for the same.

2. Description of the Related Art

In conventional optical information recording and reproducing apparatuses using phase-change optical information recording media, a wavelength-dependent filter has been used to obtain a beam having a wavelength suitable for recording and reproducing operation. Exmaples of the wavelength-dependent filter include quarter wavelength plate and a filter using liquid crystals to change a numerical aperture.

Japanese Patent Application Laid-Open (JP-A) No. 05-234136 discloses a better technique to reproduce optical information than optical resolution, introducing a filter made of an optical material having two or more of either non-linear transmittance or reflective properties, increasing a diameter of the recording beam, and decreasing a diameter of the reproducing beam at the same time.

Phase-change optical information recording media are used as a rewriting media for CD (CD-RW) or DVD. In the conventional phase-change optical information recording medium, a red LD (recording wavelength 600 to 830 nm) was used to conduct recording and reproducing operations. Recently, use of a blue LD (recording wavelength 390 to 430 nm) has been proposed in order to increase the recording capacity. However, when conducting recording and reproducing operations on a phase-change optical information recording medium with a blue LD, the noise level is high in the low power region, and it particularly becomes evident during reproducing operation.

SUMMARY OF THE INVENTION

In order to solve the problems involved in the prior art, an object of the present invention is to provide a phase-change optical information recording medium, and an optical information recording and reproducing apparatus and method which shows a low noise level with low power and more superior recording and reproducing properties in the case of recording and reproducing operations with a blue LD.

According to the present invention, there is provided a phase-change optical information recording medium which comprises a recording layer which reversibly phase-changes between the crystalline phase and the amorphous phase by irradiation of a light having a recording wavelength of 390 to 430 nm, and a layer showing a light transmittance varying according to temperature.

Also, in a preferred embodiment according to the present invention, there is provided a phase-change optical information recording medium which comprises the light transmittance thermally controllable layer.

In the phase-change optical information recording medium having the structure as described above, since a layer (a light transmittance thermally controllable layer) having a light transmittance varying according to temperature, particularly showing a low light transmittance at a low temperature is used, the light transmittance can be controlled to be low at a low power, and to be high at a high power. Consequently, it is possible to provide a phase-change optical information recording medium with improved recording and reproducing properties by using an output power from an LD with a low noise level in the high power region during reproducing and recording operation.

According to the present invention, there is provided an optical information recording and reproducing apparatus to record and reproduce information using a phase-change optical information recording medium having a recording layer which reversibly phase-changes between the crystalline phase and the amorphous phase by irradiation of a light having a recording wavelength of 390 to 430 nm, in which the apparatus comprises an optical filter having a layer (a light transmittance thermally controllable layer) showing a light transmittance varying according to temperature.

Also, in a preferred embodiment according to the present invention, there is provided an optical information recording and reproducing apparatus which comprises the optical filter having a layer (a light transmittance thermally controllable layer) showing a light transmittance varying according to temperature.

In the optical information recording and reproducing apparatus having the configuration as described above, since an optical filter having a layer showing a light transmittance varying according to temperature, particularly showing a low light transmittance at a low temperature, is used, the light transmittance can be controlled to be low at a low power and to be high at a high power. Consequently, it is possible to provide an optical information recording and reproducing apparatus with improved recording and reproducing properties and fewer errors by using an output power from an LD with a low noise level during reproducing operation and recording operation.

According to the present invention, there is provided a method for recording and reproducing optical information irradiating a light with a recording wavelength of 390 to 430 nm to the above-described phase-change optical information recording medium to perform recording and reproducing.

In the method for recording and reproducing optical information having the configuration as described above, a phase-change optical information recording medium having a layer showing various light transmittances according to temperature, particularly showing a low light transmittance at a low temperature, is used. This enables the light transmittance to be controlled low at a low power and high at a high power. Consequently, it is possible to provide a method for recording and reproducing optical information with improved recording and reproducing properties and fewer errors by using an output power from an LD with a low noise level in the high power region during reproducing and recording operation.

DESCRIPTION OF THE PREFERRED EMBODIMENTS

Figure 1:
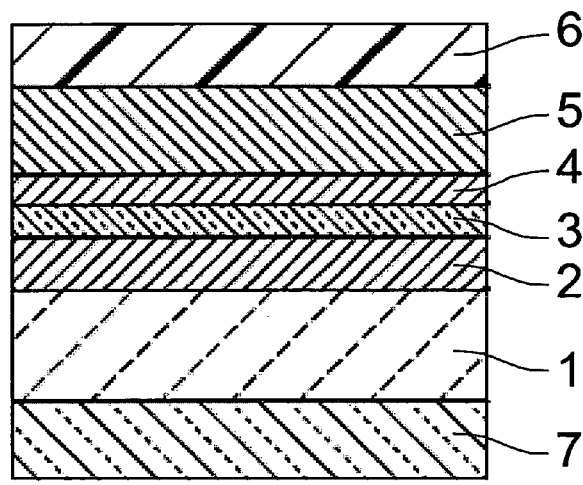
FIG. 1 is a cross-sectional view schematically showing a structure of a phase-change optical information recording medium according to an embodiment of the present invention.

The present invention will be explained in detail hereinafter.

The phase-change optical information recording medium according to the present invention comprises a recording layer which reversibly phase-changes between the crystalline phase and the amorphous phase by irradiation of a light having a recording wavelength of 390 to 430 nm, and a layer showing a light transmittance varying according to temperature. It is preferred that the light transmittance of the layer showing a light transmittance varying according to temperature (hereinafter, it refers to a light transmittance thermally controllable layer) increases depending on a rise in the temperature.

The phase-change optical information recording medium according to the present invention performs both recording and reproducing of information by irradiation of a light emitted from a blue LD. However, the output power for recording operation is 3.0 to 9.0 mW, while the output power for reproducing operation is 0.2 to 0.7 mW. Therefore, the temperature of the light transmittance thermally controllable layer is 400 to 600° C. for recording operation, while it is 50 to 220° C. for reproducing operation. The light transmittance of the light transmittance thermally controllable layer is preferably set at 70 to 90% for recording operation and 30 to 70% for reproducing operation. Thus, the light transmittance of the light transmittance thermally controllable layer increases preferably at a rate of 0.2 to 0.7% /10° C., more preferably at a rate of 0.3 to 0.6% /10° C. With a rate in the range, it is possible to use an output power from an LD with a low noise level in the high power region both for reproducing and recording operation, thereby achieving improved recording and reproducing properties. Also, by using the temperature-dependent transmittance, it is possible to inhibit the temperature increase of the recording layer, preventing deterioration of the medium. In other words, since the noise for reproducing operation may be considerably reduced without changing the diameters of the reproducing beam and the recording beam.

Materials which may be used a light transmittance thermally controllable layer include one of $Sb_2O_3$, SiO, $SiO_2$, SiN, ZnS, and GaSb, a mixture of $TiO_2$ and $PbO_2$, a mixture of TiO and $Fe_2O_3$, and a mixture of $TiO_2$ and UO, though any one satisfying the above requirements may be used.

Those materials have refractive index of approximately 2.0 to 2.1 in case of a red wavelength (approximately 655 to 650 nm), and approximately 2.4 to 2.5 in case of a blue wavelength (approximately 400 to 410). From the viewpoint of a light transmittance and recording and reproducing properties, Sin, Sio, ZnS, GaSb and the like were conventionally used with reduced refractive indices (to about 2.0) by controlling sputtering method, thereby increasing oxygen for oxide, nitrogen for nitride, S for ZnS, and adding Ne or N other than Ar when forming a film for GaSb. However, these materials having refractive indices of 2.4 or more were not used. It was completely unknown that there is a light transmittance thermal controllability when the index was as high as 2.4 or more. It is preferred to use these materials having refractive index of 2.4 or more in order to apply to a light transmittance thermally controllable layer.

The light transmittance thermally controllable layer has a thickness of preferably 20 to 500 nm, more preferably 50 to 200 nm, though depending on kinds of material.

Figure 2:
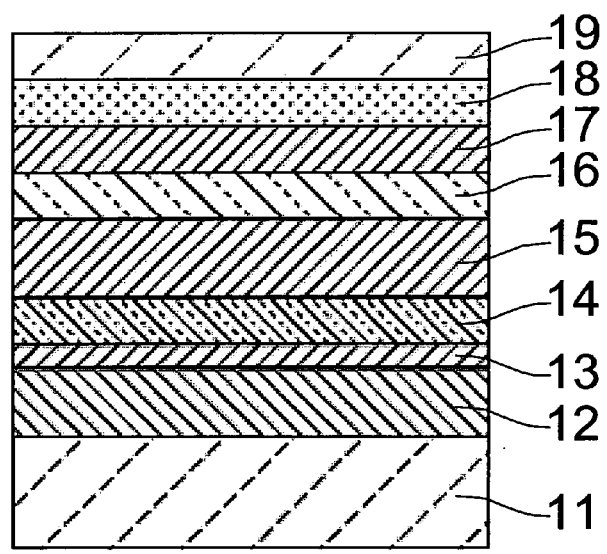
FIG. 2 is a cross-sectional view schematically showing a structure of a phase-change optical information recording medium according to another embodiment of the present invention.

Embodiments of the phase-change optical disk according to the present invention are shown in FIG. 1 and FIG. 2. However, the present invention is not limited thereto and embraces any configuration as long as it contains a recording layer and a light transmittance thermally controllable layer.

FIG. 1 shows a configuration of an optical disk comprising a first protective layer 2, a recording layer 3, a second protective layer 4, a heat-resistant layer 5, a hard coat layer (UV curable resin layer) 6 on a substrate 1 and a light transmittance thermally controllable layer 7 on the other side of the substrate 1.

FIG. 2 shows a configuration of an optical disk comprising a heat-resistant layer 12, a third protective layer 13, a recording layer 14, a second layer 15, a temperature-controllable layer 16, a first protective layer 17, an adhesive layer 18 and a thin substrate 19 on a substrate 11.

In both configurations, a laser light is irradiated at the side of the light transmittance thermally controllable layer. The configuration of FIG. 1 is used in an optical system having an NA (Numerical Aperture) of 0.74 or less and the configuration of FIG. 2 is used in an optical system having an NA (Numerical aperture) of 0.75 or more.

Next, each of the components of the phase-change optical disk according to the present invention will be explained.

The substrate is made of glass, ceramic or resins. Resin substrates are suitably used in terms of formability and cost. Examples of resin useful for the substrate include polycarbonate resins, acryl resins, epoxy resins, polystyrene resins, acrylnitrile-styrene copolymer resins, polyethylene resins, polypropylene resins, silicone type resins, fluorine type resins, ABS resins, urethane resins and the like. Among them, polycarbonate resins and acryl resins are preferred in terms of formability, optical properties and cost. The substrate is provided with an uneven pattern at one side thereof, and the heat-resistant layer and recording layer are formed on this side. The substrate is usually 0.3 to 1.2 mm thick, though it is not particularly limited. When a laser beam is not irradiated at the substrate side, optical properties of the substrate are not considered and a highly rigid polyethyleneterephthalate may be preferably used.

The protective layers (the first, second and third protective layers) are used to prevent deterioration of the recording layer and to increase adhesion strength of the recording, thereby enhancing recording properties. Examples of materials which may be used in the protective layers include metal oxides such as SiO, $SiO_2$, ZnO, $SnO_2$, $Al_2O_3$, $TiO_2$, $In_2O_3$, MgO, $ZrO_2$ and the like; metal nitrides such as $Si_3N_4$, AlN, TiN, BN, ZrN and the like; metal sulfides such as ZnS, $In_2S_3$, $TaS_4$ and the like; metal carbides such as TaC, $B_4C$, WC, TiC, ZrC and the like; carboneous material such as diamond; and mixtures thereof. Also, the protective layer may contain impurities as needed. It is necessary for the protective layer to have a melting point higher than that of the recording layer. The protective layer may be formed by various gas-phase film-forming method, including, for example, vacuum deposition, sputtering, plasma CVD, photo CVD, ion plating, electron beam deposition and the like. Among them, the sputtering method is preferred considering mass-productivity and film quality. The thickness of the first layer is preferably 30 to 200 nm, more preferably 50 to 150 nm. The thickness of the second layer is preferably 2 to 50 nm, more preferably 5 to 20 nm.

The recording layer may be made of any material which can phase-change reversibly between the crystalline phase and the amorphous phase. Typically, a composition mainly comprising Ag—In—Sb—Te, Ge—Sb—Te, In—Sb—Te, Sb—Te, In—Se along with an additives in an amount of less than 15% may be used, but it is not limited thereto. The thickness of the recording layer is preferably 5 to 30 nm, and more preferably 8 to 20 nm.

Examples of heat-resistant layer (reflective heat-resistant layer) include metals such as Al, Au, Ag, Cu, Ta and the like, or alloys thereof. Also, Cr, Ti, Si, Cu, Ag, Pd and Ta may be used as an additive element. The heat-resistant layer may be formed by various gas-phase film-forming method, including, for example, vacuum deposition, sputtering, plasma CVD, photo CVD, ion plating, electron beam deposition and the like. Among them, the sputtering method is preferred, considering mass-productivity and film quality. The thickness of the heat-resistant layer is preferably 50 to 200 nm, more preferably 100 to 150 nm.

In the structure including the thin substrate as shown in FIG. 2, when using an object lens with a high NA, it is necessary for the layer to have preferably a thickness of 0.3 mm or less, more preferably a thickness of 0.06 to 0.20 mm and to have a sheet shape. Examples of materials useful for the thin substrate include polycarbonate resins, acryl resins, epoxy resins, polystyrene resins, acrylonitrile-styrene copolymer resins, polyethylene resins, polypropylene resins, silicon type resins, fluorine type resins, ABS resins, urethane resins and the like. Among them, polycarbonate resins and acryl resins are preferred in terms of formability, optical properties and cost. Methods for forming the thin substrate using a transparent sheet include a method attaching the transparent sheet by means of a UV curable resin or transparent double-sided adhesion sheet. Alternatively, the thin substrate may be formed by applying a UV curable resin to the surface of the protective layer, followed by curing.

In introducing the hard coat layer as shown in FIG. 1, a UV curable resin may be used. Specific examples include radical UV resins. The thickness of the hard coat layer is preferably 0.1 to 10 μm, more preferably 1 to 5 μm.

The above-described configurations are basic configurations of the phase-change optical information recording medium according to the present invention. The present invention is not limited thereto and various changes and modification can be made regardless of the scope of the present invention. For example, a recording layer having a structure of double-layered or more may be used.

Next, the optical information recording and reproducing apparatus according to the present invention will be described.

Figure 3:
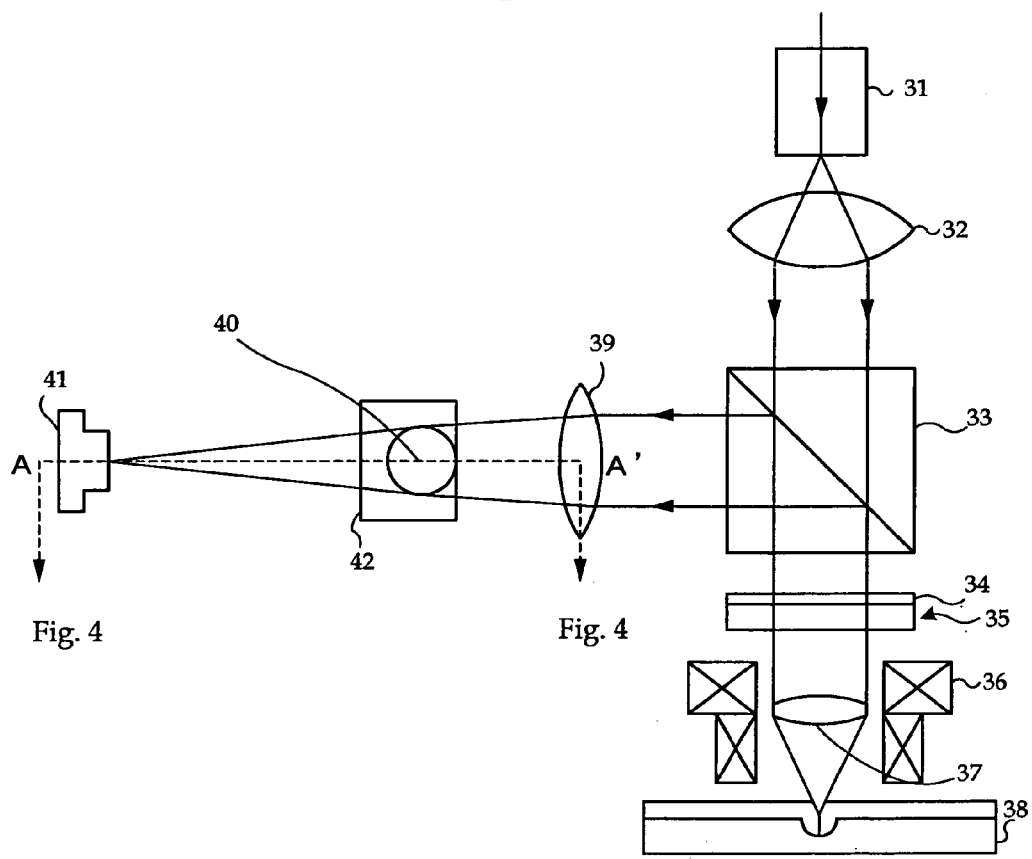
FIG. 3 is a schematic view showing a construction of an optical information recording and reproducing apparatus according to the present invention.
Figure 4:
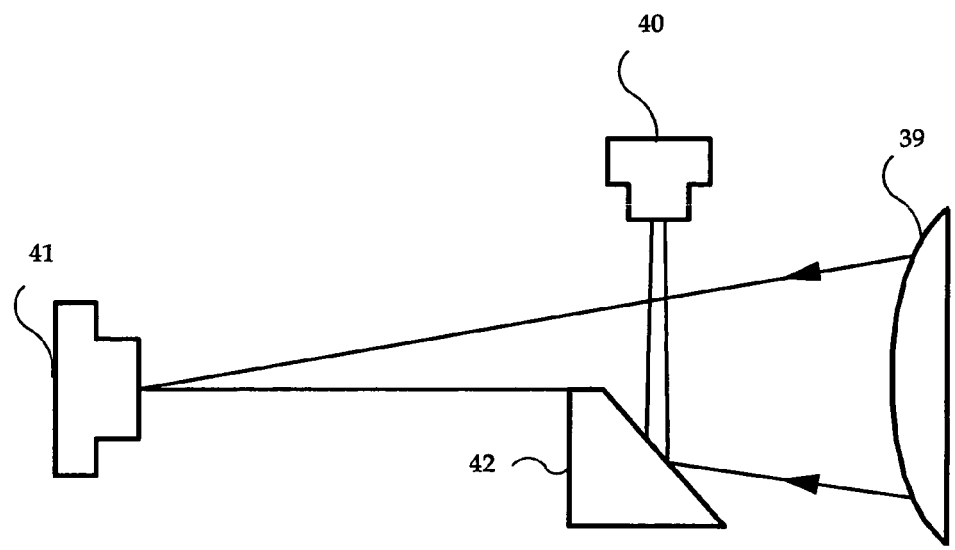
FIG. 4 is a cross-sectional view of a tracking-error detecting 2D-PD 40, a focusing error detecting 2D-PD 41, and a knife-edge 42 taken along line A and A' shown in FIG. 3.

FIG. 3 and FIG. 4 are schematic views showing a configuration of an optical information recording and reproducing apparatus according to the present invention. The optical information recording and reproducing apparatus performs recording and reproducing operation, using a conventional phase-change optical disk. However, the difference of this apparatus from the conventional apparatus lies with introducing an optical filter having a layer showing a light transmittance varying according to temperature (Hereinafter referred to a light transmittance thermally controllable layer). The optical filter may be arranged in any proper location. In this embodiment, the optical filter is introduced in the front of the quarter wavelength plate.

Passing a coupling lens 32, a beam splitter 33, and a light transmittance thermally controllable layer 34, a laser beam irradiated from a semiconductor laser 31 goes through an optical filter 35, and is converged on the information recording surface of optical information recording media (disk 38) by an object lens 37. A laser beam reflected by the information recording surface goes back into an object lens 37, deflected laterally by the beam splitter 33, and induced to an optical detecting element. 39 refers to a beam-condensing lens. 40 refers to a tracking-error detecting 2D-PD. 41 refers to a focusing error detecting 2D-PD. 42 refers to a knife-edge. 36 refers to an actuator.

In this embodiment, the light transmittance thermally controllable layer is formed at least one side of the optical filter. Preferably, the light transmittance of the light transmittance thermally controllable layer is 60 to 95% for recording operation and 30 to 70% for reproducing operation. It is preferred that the light transmittance of the light transmittance thermally controllable layer increases at a rate of 0.2 to 0.7% /10° C., more preferably at a rate of 0.3 to 0.6% /10° C. With a rate in the above-mentioned range, it is possible to use an output power from an LD with a low noise level in the high power region both for reproducing operation and for recording operation, thereby achieving improved recording and reproducing properties. Also, by using the temperature controllable transmittance, it is possible to inhibit the temperature increase of the recording layer, preventing deterioration of the medium. In other words, since the noise for reproducing operation may be considerably reduced without changing the diameters of the reproducing beam and the recording beam, and errors may be reduced by increasing the SN (Signal to Noise) ratio instead.

Examples of material which may be used in the light transmittance thermally controllable layer include the same material as described above. The thickness of the layer of a temperature-controllable transmittance is preferably 20 to 500 nm and more preferably 30 to 200 nm, although it varies according to used material. The configuration of this embodiment is the same as that of the conventional apparatus except that a light source irradiates a light having a recording wavelength of 390 to 430 nm and the optical filter includes a light transmittance thermally controllable layer.

EXAMPLE

Now, the present invention will be described using the following examples.

Example 1

On a disk-shaped polycarbonate substrate having a track pitch of 0.35 μm, a thickness of 1.1 mm and a diameter of 120 mm, a first protective layer (ZnS—SiO$_2$) having a thickness of 40 nm, a recording layer (Sb$_{68}$Te$_{29}$Ge$_3$) having a thickness of 12 nm, a second protective layer (ZnS—SiO$_2$) having a thickness of 14 nm, and a heat-resistant layer (AgPdCu) having a thickness of 120 nm were formed in this order by a sheet fed spatter device. On the obtained structure, radical UV resin (MH7617N, produced by Mitsubishi Rayon Co., Ltd.) was thickened to 5 μm as well as forming a light transmittance thermally controllable layer (Sb$_2$O$_3$) to a 30 nm-thick at a side of the disk where a light beam transmits. Thus, a phase-change optical disk having a final thickness of 1.2 mm according to the present invention was formed as shown in FIG. 1.

Comparative Example 1

On a disk-shaped polycarbonate substrate having a track pitch of 0.35 μm, a thickness of 0.6 mm and a diameter of 120 mm, a first protective layer (ZnS—SiO$_2$) having a thickness of 40 nm, a recording layer (Sb$_{68}$Te$_{29}$Ge$_3$) having a thickness of 12 nm, a second protective layer (ZnS—SiO$_2$) having a thickness of 14 nm, and a heat-resistant layer (AgPdCu) having a thickness of 120 nm were formed in this order by a sheet fed spatter machine. On the obtained structure, radical UV resin (MH7617N, produced by Mitsubishi Rayon Co., Ltd.) was thickened to 5 μm while attaching a substrate of polycarbonate having a thickness of 0.6 mm at a side of the disk where a light beam transmits by means of a modified acrylic adhesive (DA8310-A50, produced by Nitto Denko Corporation). Thus, a phase-change optical disk having a final thickness of 1.2 mm was formed.

For crystallization of a recording layer of the phase-change optical disk prepared as described above, the optical disk was initialized in 10 mW/(μm$^2$) and 3 m/s. In order to assess the quality of the optical disk, reproduction of the information recorded on the optical disk was performed under conditions as follows:
Reproducing wavelength: 400 nm
NA=0.65
Linear speed: 6.0 m/s
Recording bit length: 0.17 μm/bit
Recording power: 9 mW
Erasing power: 5.5 mW As a result, the phase-change optical disk of Example 1 showed a jitter of 7.5%, while the phase-change optical disk of Comparative Example 1 showed a jitter of 12.9%, causing poor recording and reproducing operations. The results of Example 1 are shown in Table 1.

Examples 2–4

Phase-change optical disks according to the present invention were prepared following the same procedure as in Example 1, except for using material described in Table 1 as the light transmittance thermally controllable layer. The recording layers of the prepared phase-change optical disks were initialized and examined for their reproducing qualities as in Example 1. The results are shown in Table 1.

Examples 5–8

On a disk-shaped polycarbonate substrate having a track pitch of 0.35 μm, a thickness of 1.1 mm and a diameter of 120 mm, a heat-resistant layer (Ag$_{94}$Cu$_3$Pd$_3$) having a thickness of 100 nm, a third protective layer (ZnS—SiO$_2$) having a thickness of 3 nm, a light transmittance thermally controllable layer (Table 1), a second protective layer (ZnS—SiO$_2$) having a thickness of 5 nm, a recording layer (Ag$_5$In$_5$Sb$_{65}$Te$_{25}$) having a thickness of 10 nm, and a first protective layer (ZnS—SiO$_2$) having a thickness of 100 nm were formed in this order by a sheet fed spatter machine. On the obtained structure, a thin substrate of polycarbonate having a thickness of 0.6 mm was attached by means of an acrylic adhesive (DA8310-A50, produced by Nitto Denko Corporation). Thus, a phase-change optical disk having a final thickness of 1.2 mm according to the present invention was formed as shown in FIG. 2.

For crystallization of a recording layer of the phase-change optical disk prepared as described above, the optical disk was initialized at 10 mW/(μm)$^2$ and 3 m/s. Reproduction of the information recorded on the optical disk was performed under conditions as follows.
Reproducing wavelength: 405 nm
NA=0.85
Linear speed: 6.0 m/s
Recording bit length: 0.13 μm/bit
Recording power: 6 mW
Erasing power: 3.5 mW

TABLE 1

| Examples | Composition | Refractive Index (n) | Thickness (nm) | NA | Jitter (%) | Light Transmittance (%) 100° C. | Light Transmittance (%) 500° C. | Reproducing Power (mW) | Recording Power/Max. Reproducing Power |
|---|---|---|---|---|---|---|---|---|---|
| Ex. 1 | Sb$_2$O$_3$ | 2.1 | 30 | 0.65 | 8.1 | 52 | 87 | 0.3–1.05 | 8.6 |
| Ex. 2 | TiO$_2$ + PbO$_2$ | 2.0 | 30 | 0.65 | 7.7 | 63 | 86 | 0.3–1.05 | 8.6 |
| Ex. 3 | TiO$_2$ + Fe$_2$O$_3$ | 2.1 | 30 | 0.65 | 7.6 | 67 | 81 | 0.3–1.05 | 8.6 |
| Ex. 4 | TiO$_2$ + UO | 2.0 | 30 | 0.65 | 8.4 | 62 | 82 | 0.3–1.05 | 8.6 |
| Ex. 5 | SiO$_2$ | 3.2 | 30 | 0.85 | 7.3 | 74 | 92 | 0.2–0.7 | 8.6 |
| Ex. 6 | SiN$_{1.4}$ | 3.0 | 30 | 0.85 | 7.5 | 63 | 90 | 0.2–0.7 | 8.6 |
| Ex. 7 | ZnS | 2.5 | 30 | 0.85 | 8.3 | 61 | 84 | 0.2–0.7 | 8.6 |
| Ex. 8 | GaSb | 2.6 | 30 | 0.85 | 8.6 | 58 | 81 | 0.2–0.7 | 8.6 |

As clearly seen from Table 1, all the phase-change optical disks of Examples 1 to 8 had a jitter of not more than 9%, showing good reproducibility. Further, the ratio of the recording power to the stable read power (the power does not damages the recording marks) was 8.6 to 10. Thus, since it is possible to increase an actual power for a reproducing light can be raised due to the low temperature at the low-temperature side, it is possible to lower the ratio of recording power to reproducing power. Also, this suggests that, according to the present invention, it is possible to reproduce information recorded at a high density and a high speed by using a reproducing power range with a low noise level of a blue LD having a wavelength of 390 to 430 nm.

Comparative Example 2

A phase-change optical disk was prepared following the same procedure as in Example 5, except for the introduction of light transmittance thermally controllable layer. The recording layers of the prepared phase-change optical disks were initialized and examined for their reproducing qualities as in Example 5. As a result, the phase-change optical disk showed a poor jitter of 11%, increasing the ratio of recording power to reproducing power of 19. Therefore, noise in the blue wavelength region of 390 to 430 nm could not be lowered.

Examples 9–16

Using an optical information reproducing apparatus as shown in FIG. 3, a glass substrate (thickness of 0.5 mm) on which a light transmittance thermally controllable layer (thickness of 100 nm) comprising the materials described in Table 2, was formed by a spatter, was placed on a quarter wavelength plate. The phase-change optical disk was examined under conditions as follows. The results are shown in Table 2.

Conditions for Examples 9–12
  Reproducing wavelength: 405 nm
  NA=0.65
  Linear speed: 6.0 m/s
  Recording bit length: 0.17 μm/bit
  Recording power: 7.9 mW
  Erasing power: 4.5 mW Conditions for Examples 13–16
  Reproducing wavelength: 405 nm
  NA=0.65
  Linear speed: 6.0 m/s
  Recording bit length: 0.17 μm/bit
  Recording power: 7.9 mW
  Erasing power: 4.5 mW was 19. It prevented the use of a blue LD having a wavelength range of 390 to 430 nm.

According to the one aspect of the invention, by using a layer having a light transmittance varying according to temperature, particularly showing a low light transmittance at a low temperature, the light transmittance may be controlled to be low at a low power or to be high at a high power. Consequently, it is possible to provide a phase-change optical information recording medium with improved recording and reproducing properties by using an output power from an LD with a low noise level in the high power region for both reproducing operation and recording operation.

According to the present invention, by using a layer having a light transmittance varying according to temperature, particularly showing a low light transmittance at a low temperature, in an optical filter, the light transmittance can be controlled to be low at a low power or to be high at a high power. Consequently, it is possible to provide an optical information recording and reproducing apparatus with improved recording and reproducing properties and fewer errors by using an output power from an LD with a low noise level in the high power region both for reproducing operation and recording operation.

According to the present invention, by using a phase-change optical information recording medium having a layer showing various light transmittance according to temperature, particularly showing a low light transmittance at a low

TABLE 2

| Examples | Composition | Refractive Index (n) | Thickness (nm) | NA | Jitter (%) | Light Transmittance (%) 100° C. | Light Transmittance (%) 500° C. | Reproducing Power (mW) | Recording Power/Max. Reproducing Power |
|---|---|---|---|---|---|---|---|---|---|
| Ex. 9  | Sb$_2$O$_3$       | 2.1 | 100 | 0.65 | 7.9 | 49 | 82 | 0.3–1.05 | 7.5 |
| Ex. 10 | TiO$_2$ + PbO$_2$ | 2.0 | 100 | 0.65 | 7.4 | 58 | 82 | 0.3–1.05 | 7.5 |
| Ex. 11 | TiO$_2$ + Fe$_2$O$_3$ | 2.1 | 100 | 0.65 | 7.1 | 64 | 79 | 0.3–1.05 | 7.5 |
| Ex. 12 | TiO$_2$ + UO      | 2.0 | 100 | 0.65 | 7.9 | 59 | 78 | 0.3–1.05 | 7.5 |
| Ex. 13 | SiO$_2$           | 3.2 | 100 | 0.85 | 7.0 | 71 | 86 | 0.3–1.05 | 7.5 |
| Ex. 14 | SiN$_{1.4}$       | 3.0 | 100 | 0.85 | 7.2 | 59 | 87 | 0.3–1.05 | 7.5 |
| Ex. 15 | ZnS               | 2.5 | 100 | 0.85 | 8.0 | 56 | 80 | 0.3–1.05 | 7.5 |
| Ex. 16 | GaSb              | 2.6 | 100 | 0.85 | 8.2 | 52 | 78 | 0.3–1.05 | 7.5 |

As clearly seen from Table 2, all the phase-change optical disks of Examples 9–16 had a jitter of 9%, showing good reproducibility. Since a high reproducing power could be used, it is possible to reproduce information recorded at a high density and a high speed by using a reproducing power range with a low noise level of a blue LD having a wavelength of 390 to 430 nm. Further, the ratio of the recording power to the maximum reproducing power was 7.5, successfully kept below 10.

Comparative Example 3

The phase-change optical disk prepared in Comparative Example 1 was assessed on a optical information reproducing apparatus (NA=0.65) used in Examples 9–16, except that the glass substrate (thickness of 0.5 mm) on which a light transmittance thermally controllable layer (thickness of 100 nm) comprising the materials described in Table 2 was formed by a spatter, was not placed on a quarter wavelength plate. As a result, it was found out that the jitter was 12.5% and that the ratio of recording power to reproducing power temperature, the light transmittance can be controlled to be low at a low power or to be high at a high power. Consequently, it is possible to provide a method for recording and reproducing optical information with improved recording and reproducing properties and small errors by using an output power from an LD with a low noise level in the high power region or both for reproducing and recording operation.

What is claimed is:

1. A phase-change optical information recording medium comprising:
   a recording layer which reversibly phase-changes between the crystalline phase and the amorphous phase by irradiation of a light having a recording wavelength of 390 to 430 nm; and
   a light transmittance thermally controllable layer,
   wherein a light transmittance of said light transmittance thermally controllable layer varies according to temperature.

2. A phase-change optical information recording medium according to claim 1, wherein the light transmittance of the light transmittance thermally controllable layer increases based on rise in temperature.

3. A phase-change optical information recording medium according to claim 2, wherein the light transmittance increases at a rate of 0.2 to 0.7% /10° C.

4. A phase-change optical information recording medium according to claim 2, wherein the light transmittance thermally controllable layer comprises any one selected from;
   (a) One of $Sb_2O_3$, SiO, $SiO_2$, SiN, ZnS, and GaSb;
   (b) a mixture of $TiO_2$, and $Pb_2O_2$;
   (c) a mixture of $TiO_2$ and $Fe_2O_3$; and
   (d) a mixture of $TiO_2$ and UO.

5. A phase-change optical information recording medium according to claim 4, wherein the light transmittance thermally controllable layer has a refractive index of 2.4 or more.

6. A phase-change optical information recording medium according to claim 1, wherein the light transmittance thermally controllable layer has a thickness of 20 to 500 nm.

7. A phase-change optical information recording medium according to claim 1, wherein the light transmittance of the light transmittance thermally controllable layer is 70 to 90% at the time of recording, and 30 to 70% at the time of reproducing.

8. A phase-change optical information recording apparatus utilizing a recording layer which reversibly phase-changes between the crystalline phase and the amorphous phase by irradiation of a light having a recording wavelength of 390 to 430 nm, said apparatus comprising a light filter comprising a light transmittance thermally controllable layer, wherein a light transmittance of said light transmittance thermally controllable layer varies according to a temperature of the light transmittance thermally controllable layer.

9. An optical information recording and reproducing apparatus according to claim 8, further comprising:
   (a) a light head comprising a light detector which intercepts: the light having a recording wavelength of 390 nm to 430 nm irradiated from the semiconductor; and the light reflected by the optical information recording medium;
   (b) an actuator to follow access and track by actuating the light head; and
   (c) an optical filter placed on a light path of the laser beam irradiated from the semiconductor laser converges on the optical information recording medium.

10. An optical information recording and reproducing apparatus according to claim 8, wherein the light transmittance of the light transmittance thermally controllable layer increases as the temperature rises.

11. An optical information recording and reproducing apparatus according to claim 10, wherein the light transmittance comprising any one selected from:
   (a) one of $Sb_2O_3$, SiO, $SiO_2$, SiN, ZnS, and GaSb;
   (b) a mixture of $TiO_2$, and $Pb_2O_2$;
   (c) a mixture of $TiO_2$ and $Fe_2O_3$; and
   (d) a mixture of $TiO_2$ and UO.

12. An optical information recording and reproducing apparatus according to claim 11, wherein a refractive index of the light transmittance thermally controllable layer is 2.4 or more.

13. An optical information recording and reproducing apparatus according to claim 8, wherein the light transmittance increases at a rate of 0.2 to 0.7% /10° C.

14. An optical information recording and reproducing apparatus according to claim 8, wherein the light transmittance thermally controllable layer has a thickness of 20 to 500 nm.

15. An optical information recording and reproducing apparatus according to claim 8, wherein the light transmittance of the light transmittance thermally controllable layer is 70 to 90% at the time of recording and 30 to 70% at the time of reproducing.

16. A method for recording and reproducing optical information by irradiating a light having a recording wavelength of 390 nm to 430 nm to perform recording and reproducing to a phase changing optical information recording medium which comprises: a light transmittance thermally controllable layer in which a light transmission varies according to temperature; and a recording layer which reversibly phase-changes between the crystalline phase and the amorphous phase by irradiation of the light having the recording wavelength of 390 nm to 430 nm.

17. A method for recording and reproducing optical information according to claim 16, wherein the light transmittance of the light transmittance thermally controllable layer is 70 to 90% at the time of recording and 30 to 70% at the time of reproducing.

18. A method for recording and reproducing optical information according to claim 16, wherein a value of the stable read power of the light irradiated by the light source is 10 or less when the recording power irradiated by the light source for recording is defined as 1.

19. A method for recording and reproducing optical information by irradiating a light having a recording wavelength of 390 nm to 430 nm, through an optical filter having a light transmittance thermally controllable layer which shows a light transmittance varying according to temperature, to a phase-change optical information recording medium, to perform recording and reproducing.

20. A method for recording and reproducing optical information according to claim 19, wherein the light transmittance of the light transmittance thermally controllable layer is 70 to 90% at the time of recording and 30 to 70% at the time of reproducing.

21. A method for recording and reproducing optical information according to claim 20, wherein the ratio of the recording power which is irradiated by a light source for recording to the reproducing power which is the stable read power of the light irradiated by the light source is 10 or less.

* * * * *

UNITED STATES PATENT AND TRADEMARK OFFICE
CERTIFICATE OF CORRECTION

PATENT NO.        : 7,042,830 B2
APPLICATION NO.   : 10/192246
DATED             : May 9, 2006
INVENTOR(S)       : Shinotsuka et al.

It is certified that error appears in the above-identified patent and that said Letters Patent is hereby corrected as shown below:

Title Page
Replace the Assignee section on the cover page of the patent, with the following:

--(73) Assignee: Ricoh Company, Ltd., Tokyo (JP);
              Nichia Corporation, Tokushima (JP)--

Signed and Sealed this

Twelfth Day of February, 2008

JON W. DUDAS
*Director of the United States Patent and Trademark Office*